(12) United States Patent
Tertnes (10) Patent No.: US 8,162,381 B2
(45) Date of Patent: Apr. 24, 2012

(54) INFLATABLE DRAG REDUCTION DEVICE FOR VEHICLES

(75) Inventor: Roald Tertnes, Mjolkeraen (NO)

(73) Assignee: Tecama Holding AS, Mjolkeraen (NO)

( * ) Notice: Subject to any disclaimer, the term of this patent is extended or adjusted under 35 U.S.C. 154(b) by 0 days.

(21) Appl. No.: 12/992,267

(22) PCT Filed: May 15, 2009

(86) PCT No.: PCT/NO2009/000185
§ 371 (c)(1),
(2), (4) Date: Nov. 12, 2010

(87) PCT Pub. No.: WO2009/139642
PCT Pub. Date: Nov. 19, 2009

(65) Prior Publication Data
US 2011/0101730 A1 May 5, 2011

Related U.S. Application Data

(60) Provisional application No. 61/053,227, filed on May 15, 2008.

(51) Int. Cl.
*B62D 35/00* (2006.01)
(52) U.S. Cl. .................................. 296/180.1; 296/180.4
(58) Field of Classification Search ............... 296/180.1, 296/180.2, 180.4, 181.5; 180/903
See application file for complete search history.

(56) References Cited

U.S. PATENT DOCUMENTS

| 2,737,411 | A | * | 3/1956 | Potter | 296/180.4 |
|---|---|---|---|---|---|
| 4,601,508 | A | * | 7/1986 | Kerian | 296/180.4 |
| 4,702,509 | A | * | 10/1987 | Elliott, Sr. | 296/180.4 |
| 4,741,569 | A | * | 5/1988 | Sutphen | 296/180.4 |
| 4,978,162 | A | * | 12/1990 | Labbe | 296/180.2 |
| 5,058,945 | A | * | 10/1991 | Elliott et al. | 296/180.5 |
| 5,236,347 | A | * | 8/1993 | Andrus | 296/180.4 |
| 5,375,903 | A | * | 12/1994 | Lechner | 296/180.1 |
| 6,409,252 | B1 | * | 6/2002 | Andrus | 296/180.4 |
| 6,467,833 | B1 | * | 10/2002 | Travers | 296/180.4 |
| 6,742,616 | B2 | * | 6/2004 | Leban | 180/116 |
| 6,789,839 | B1 | * | 9/2004 | Samuelson | 296/180.4 |
| 7,147,270 | B1 | * | 12/2006 | Andrus et al. | 296/180.5 |
| 7,243,980 | B2 | * | 7/2007 | Vala | 296/180.4 |
| 7,374,230 | B2 | * | 5/2008 | Breidenbach | 296/180.4 |
| 7,866,734 | B2 | * | 1/2011 | Mracek | 296/180.4 |
| 2006/0273625 | A1 | | 12/2006 | Andrus | |

FOREIGN PATENT DOCUMENTS

WO    2007/014472    2/2007

OTHER PUBLICATIONS

ISR WR Aug. 25, 2009.

* cited by examiner

*Primary Examiner* — Glenn Dayoan
*Assistant Examiner* — Gregory Blankenship
(74) *Attorney, Agent, or Firm* — Christian D. Abel (57) ABSTRACT

Inflatable drag reduction device (20, 22) for vehicles, comprising an inflatable bag of a durable, flexible and generally air-tight material, arranged for attachment to the vehicle. The bag comprises of a plurality of conjoined panels and an air duct arranged for allowing the inflow of air into the interior of the bag when the vehicle is in motion. The bag further comprises internal ribs of a generally non-elastic material attached to the internal surfaces of the panels, that assist the bag in assuming a predetermined geometrical shape in which the panels are prevented from billowing outward.

13 Claims, 10 Drawing Sheets

INFLATABLE DRAG REDUCTION DEVICE FOR VEHICLES

This application is a US national stage of PCT/NO2009/000185 filed 15 May, 2009, and claims the benefit under 35 USC §119 to U.S. provisional application 61/053,227, filed 15 May 2008.

BACKGROUND OF THE INVENTION

1. Field of the invention

The present invention relates to inflatable devices for reducing air drag on moving vehicles.

2. Prior art

It is well known that a moving vehicle, and in particular a moving tractor trailer having a rectangular shape, will create an area of low pressure at the rear of the vehicle causing a significant amount of drag. The opening between sections of a tandem trailer will also experience turbulence and/or drag forces. Among other things, the drag forces cause increased fuel consumption.

A number of prior art devices have been proposed that attempt to improve the aerodynamic shape of a vehicle, in particular a tractor trailer, by providing an inflatable attachment at the rear of such a vehicle, or between sections of a tandem vehicle. Examples of such prior art devices include U.S. Pat. Nos. 6,409,252; 5,236,347; 4,978,162; 4,741,569; 4,688, 841; and CA2,470,291.

While all of these references are based upon the principle of creating a more streamlined shape for a moving vehicles, the inflatable devices disclosed therein do not assume an optimal and stable shape at highway speeds, and are cumbersome and difficult to install.

DETAILED DESCRIPTION

Figure 1:
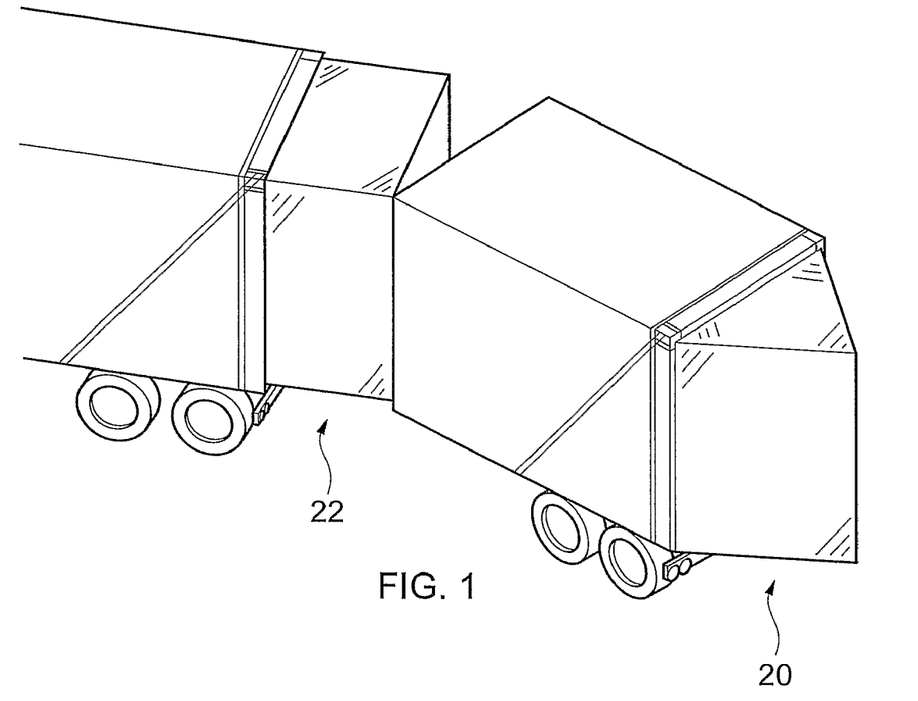
FIG. 1 is a perspective view of a first embodiment of the device attached to the rear of a tractor trailer, and a second embodiment of the device attached between sections of a tandem trailer.

FIG. 1 shows a device 20 according to one aspect of the invention for attachment to the rear of a transport trailer, and a device 22 according to another aspect of the invention for attachment between sections of a tandem trailer. The device according to the invention is inflatable, and is therefore constructed of a durable, flexible and generally airtight material.

Figure 2:
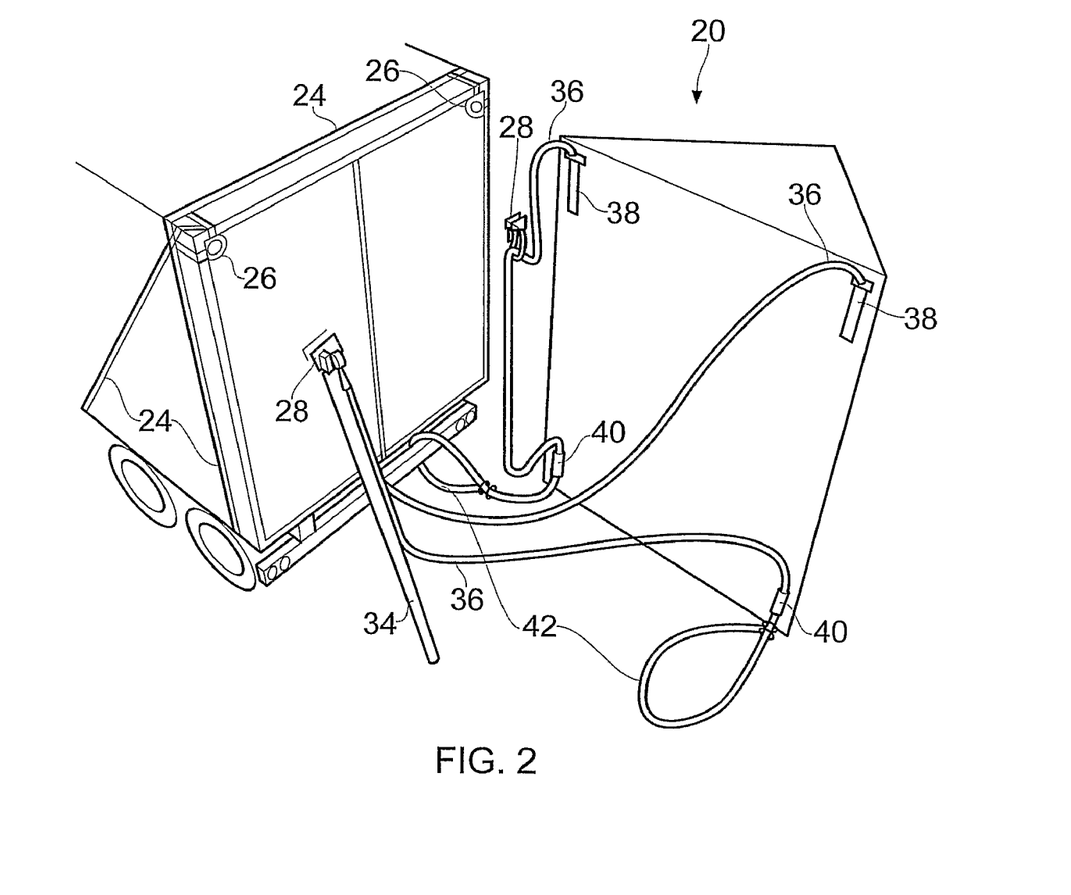
FIG. 2 is a perspective view of the attachment arrangement for the first embodiment.

According to one aspect of the invention, devices 20 and 22 are modular, meaning that they may be easily attached to existing trailers without the need for modifications to the trailer itself. FIG. 2 shows one embodiment of a removable attachment arrangement for the device according to the invention, in this instance showing an attachment arrangement for device 20. For ease of illustration FIG. 2 shows the device in the geometric shape that it will assume when inflated by moving air, but it should be understood that the device would actually be collapsed in an uninflated state.

Figure 7:
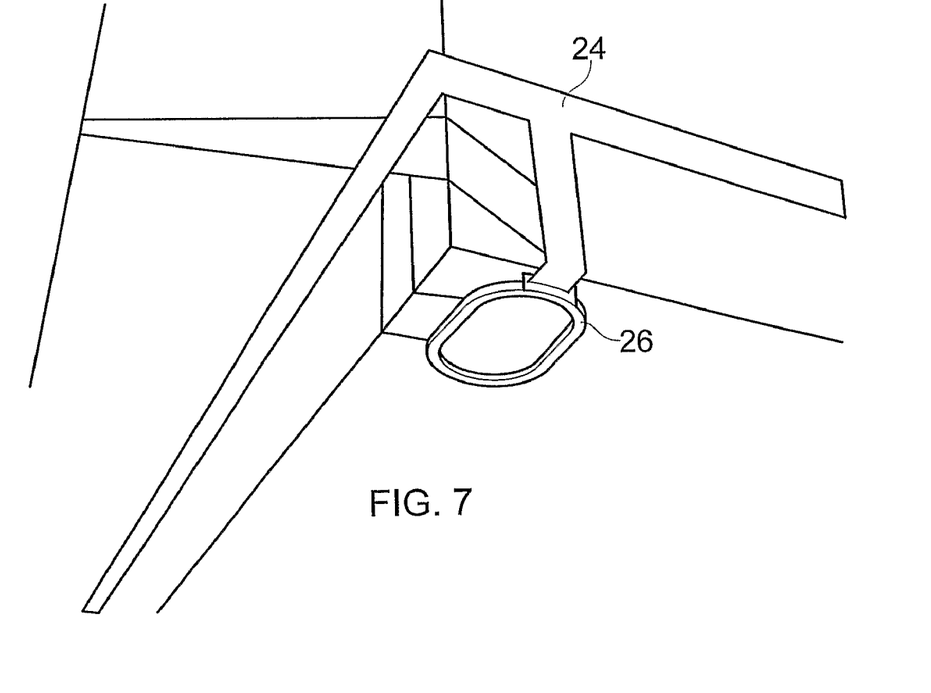
FIG. 7 and FIG. 8 are perspective views of components of the attachment arrangement for the first and, second embodiments.
Figure 12:
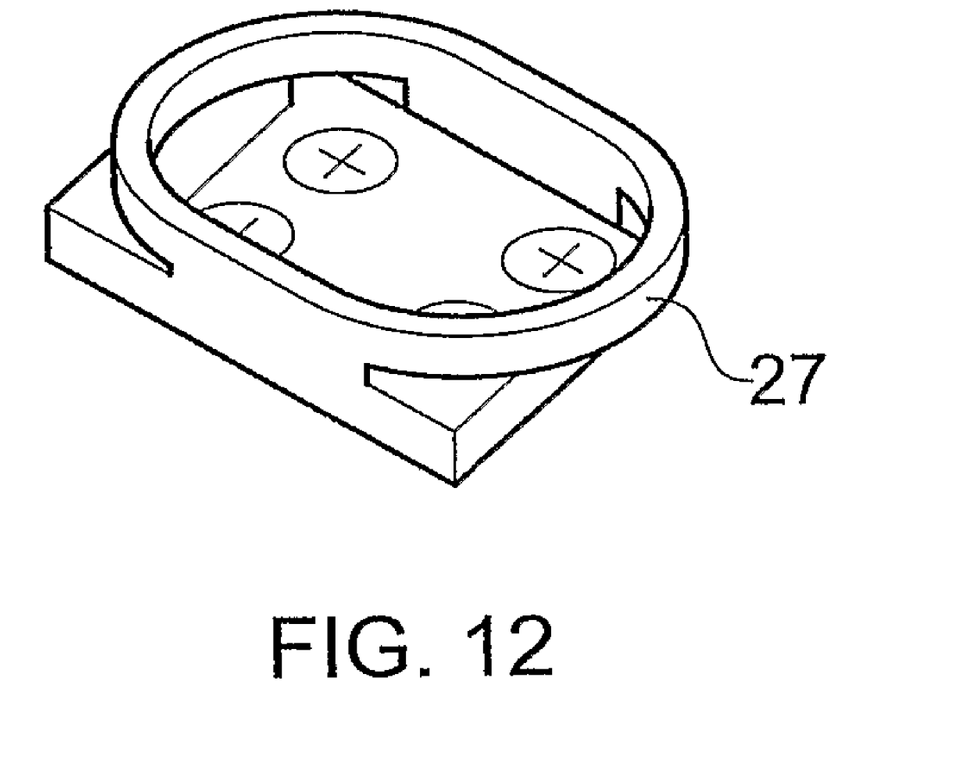
FIG. 12 is a perspective view of an alternative embodiment of an attachment ring

As seen in FIG. 2, the removable attachment arrangement comprises a cincture strap 24 secured around the outside perimeter of the trailer. Attachment rings 26 are connected to the cincture strap 24 and arranged at the upper corners of the trailer, as shown in more detail in FIG. 7. While the preferred embodiment contemplates a removable attachment arrangement, according to another aspect of the invention an attachment ring member 27, as shown in FIG. 12, can be permanently affixed to the upper corners of the back of the vehicle. In some cases the container may have openings in the corners of the appropriate size, in which case those openings may be employed instead of an attachment ring.

Figure 8:
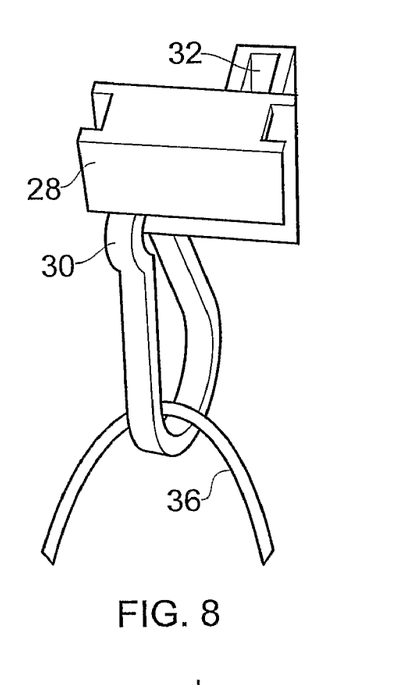

Each attachment ring 26 is adapted to receive the lip of a removable hook member 28. As shown in FIG. 8, hook members 28 comprise a clasp 30 and a collar 32. Collar 32 is adapted for receiving one end of a mounting pole 34 as shown in FIG. 2, which is used to lift the hook member 28 up and into engagement with attachment rings 26. According to one aspect of the invention, collar 32 and the corresponding end of pole 34 are rectangular to permit rotational manipulation of the pole, however any appropriate shape could be employed.

As shown in FIG. 2, an attachment strap 36 is attached to each of the upper corners of the back side of device 20 or 22 at attachment points 38. Each strap 36 passes through clasp 30 of its corresponding hook 28, and thereafter through one of two slits 40 integrated into the lower corners of the back side of the device. Straps 36 further comprise an adjustable attachment loop 42 at their lower ends.

The device according to the invention is easily mounted to any existing trailer by first securing cincture strap 24 near the rear of the trailer. Pole 34 is inserted into collars 32 of hook members 28 and used to lift them into engagement with rings 26. The user secures adjustable loop 42 to a convenient structure near the bottom of the trailer, such as a bumper or the like, and pulls on the free end of strap 36 until the upper corners of the device are raised into position. Loop 42 is thereupon tightened and secured. The mounted device will, in an uninflated, collapsed state, have a shape similar to that illustrated in FIG. 4. For the device according to a second embodiment 22 for use between trailer sections of a tandem trailer, only one side of the device will be mounted to the back end of one trailer section, with the other side free as shown in FIG. 1.

As seen in FIG. 1, the first embodiment of the invention assumes a triangular cross section when inflated. FIGS. 3, 4, 5 and 6 show the internal structure of the first embodiment, one function of which is to maintain the stability and shape of the triangular cross section when subjected to strong airflows at highway speeds. While the following description relates to the triangular cross section of the first embodiment, it will be appreciated by one skilled in the art that corresponding structures can be employed for the rectangular cross section of the second embodiment.

Figure 5:
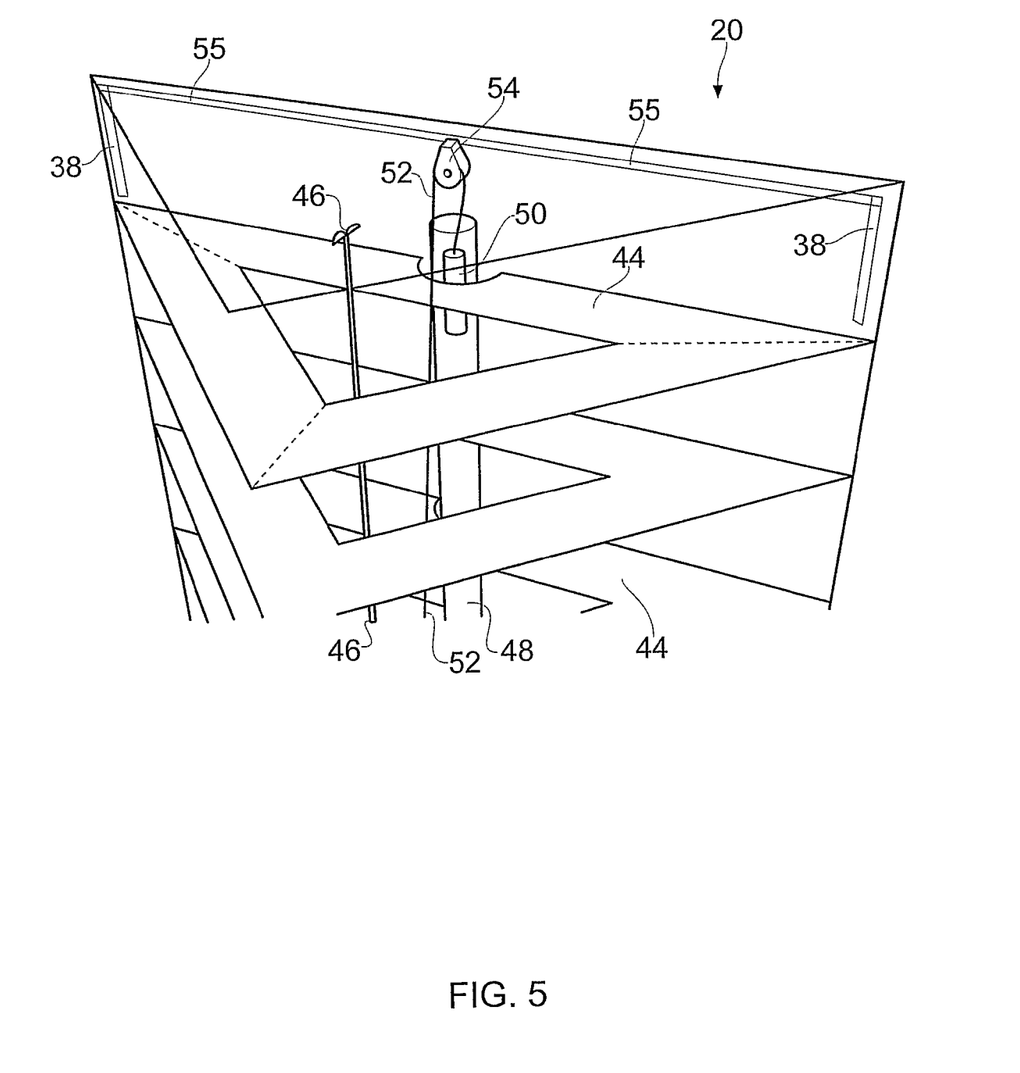
FIG. 5 is a transparent perspective view showing internal structure of the first embodiment.
Figure 6:
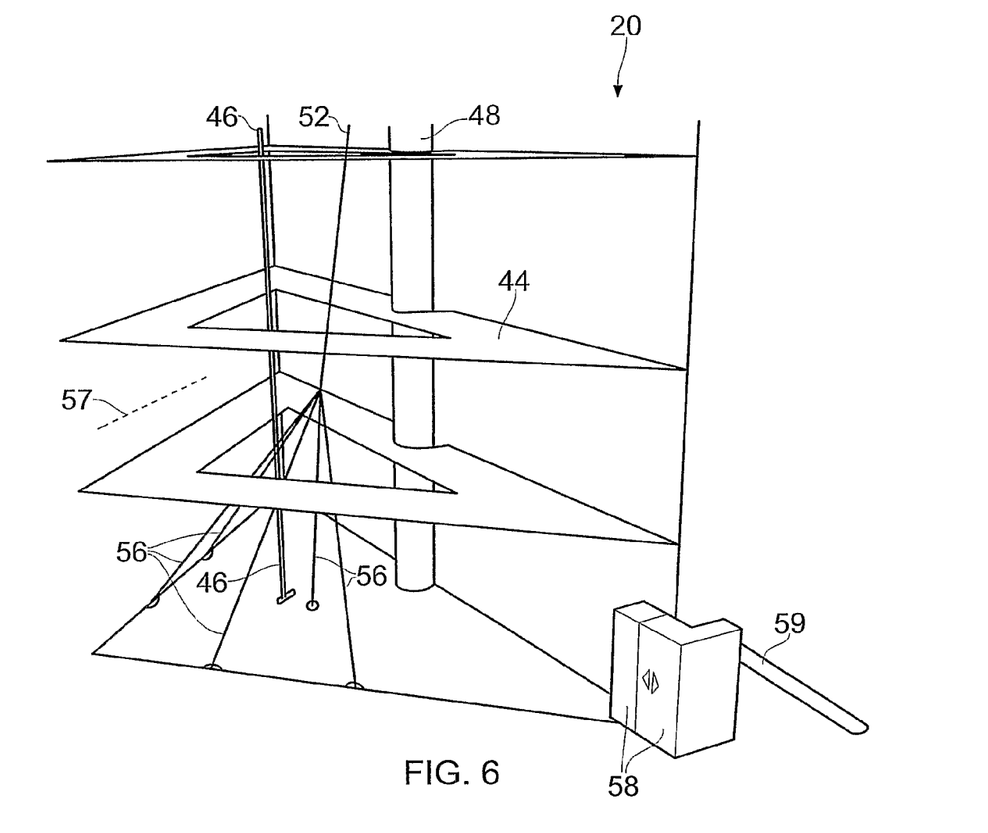
FIG. 6 is a transparent perspective view showing internal structure of the first embodiment as well as an embodiment of an air intake duct.
Figure 10:
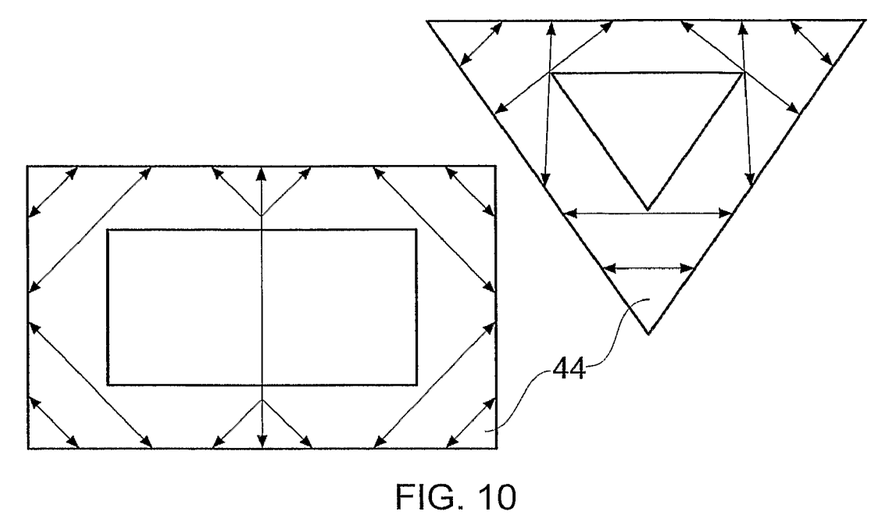
FIG. 10 is an illustration of the lines of pulling forces experienced by the first and second embodiments caused by the expansion of the device when a vehicle is moving at highway speeds.
Figure 11:
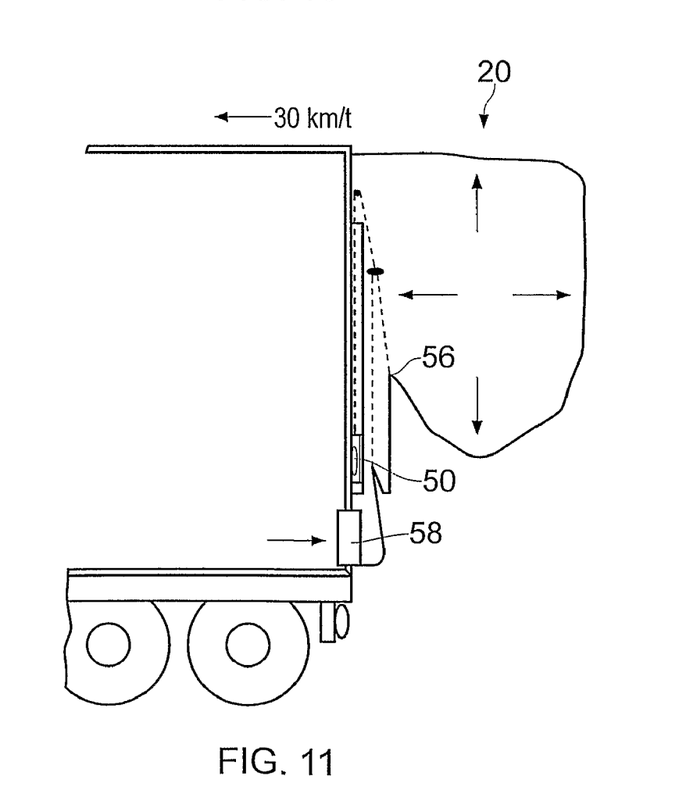
FIG. 11 is a side elevational view of the first embodiment partially expanded.

As seen in FIG. 5, the device comprises a plurality of internal rib members 44. Rib members 44 are preferably made of a nonelastic material and according to one aspect of the invention of the same material as the outer panels of the device. The rib members are in the form of three strips sewn together at adjacent ends, and sewn into the material along their outer edges to the inside surface of the side panels of the device. A vertical triangular channel will thus be formed in the interior of the device. The ribs serve to impart rigidity to the device, allowing it to maintain the triangular cross section when subjected to the forces depicted in FIG. 10. A tension cord 46 is attached to the top panel and bottom panel of the device. When inflated, the ribs prevent the device from billowing outward from the sides, and tension cord 46 prevents the device from billowing out at the top and bottom.

Figure 3:
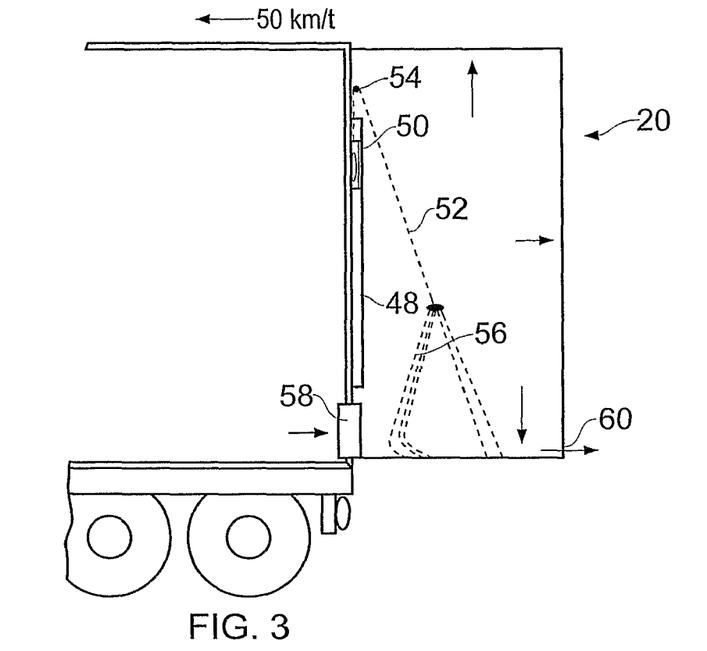
FIG. 3 and FIG. 4 are sectional side views showing the internal arrangement of various components of the first embodiment.
Figure 4:
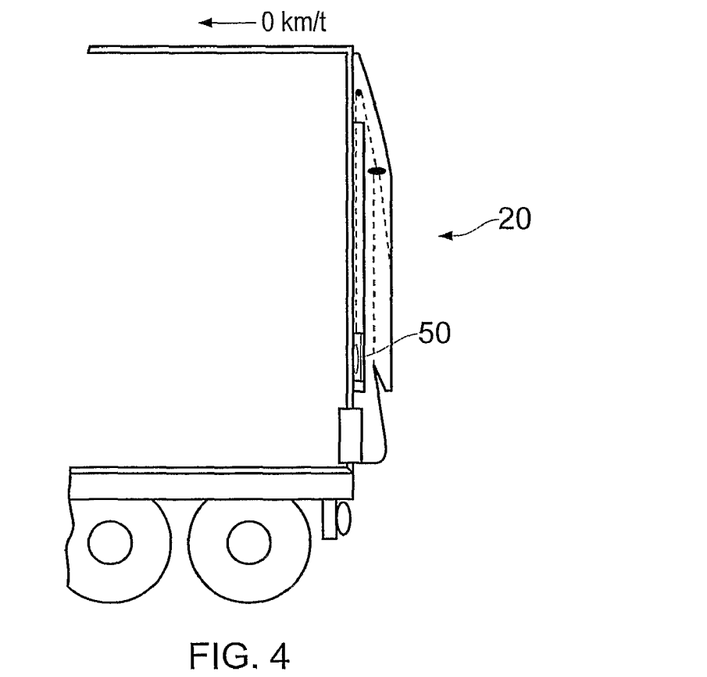
Figure 9:
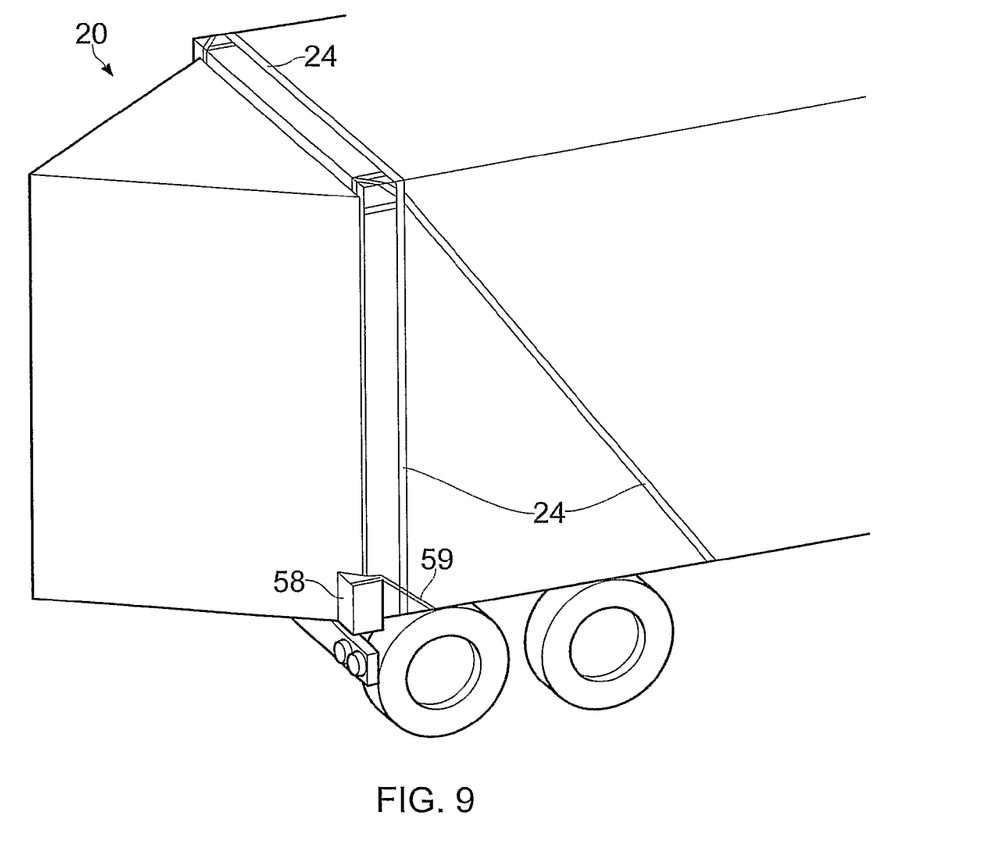
FIG. 9 is a perspective view of a first embodiment of the device attached to the rear of a tractor trailer.

The device further comprises means for automatically assuming the compact, collapsed configuration shown in FIG. 4 when the vehicle slows below a predetermined speed. The device therefore further comprises a vertical, internal sleeve member 48 affixed to the inside surface of the back side of the device. According to one aspect of the invention, the sleeve is preferably sewn from the same material as the device. A weight member 50 is arranged in the sleeve, and connected by a cord 52, via a pulley 54, to a fan-shaped plurality of cords 56 attached to the bottom panel of the device, shown in FIG. 6. Pulley 54 is suspended from a strap 55. When the vehicle is in motion, air pressure from air entering in through an air duct 58 will cause an increase in the air pressure inside the device, tending to causing it to expand. Air duct 58 is preferable located slightly to the side of the vehicle as shown in FIG. 9, and is secured to the vehicle a strap 59. When the vehicle reaches a predetermined speed, the inside air pressure will exceed the weight of member 50, which will be raised inside sleeve 48, as depicted in FIG. 3. When the vehicle slows below a predetermined speed, the weight of member 50 will exceed the pressure acting on the inside of the device, and fall inside sleeve 48, drawing the device closed by pulling on cords 56, whereby the device will assume a collapsed shape as shown in FIG. 4.

The length of cord 52 may be chosen so as to determine the degree of tapering of the top and bottoms panels of the device. The illustrations shown in the figures show a preferred embodiment having a degree of taper of zero degrees, wherein the side panels of the device are essentially rectangular. In such case the length of cord 52 will be essentially equal to the height of the trailer section. By choosing a shorter length for cord 52 (and making corresponding adjustments to the geometric shape of the side panels), a greater degree of taper can be selected. According to one aspect of the invention, the degree of taper is 17 degrees or less.

Figure 13:
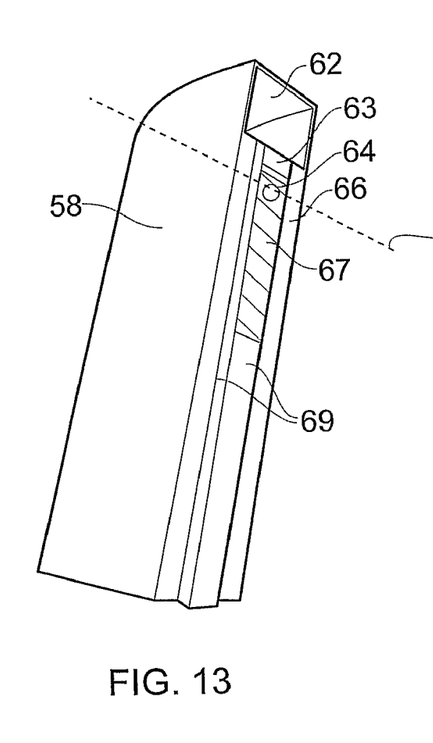
FIGS. 13 and 14 are perspective views of an alternative arrangement for an air intake duct.
Figure 14:
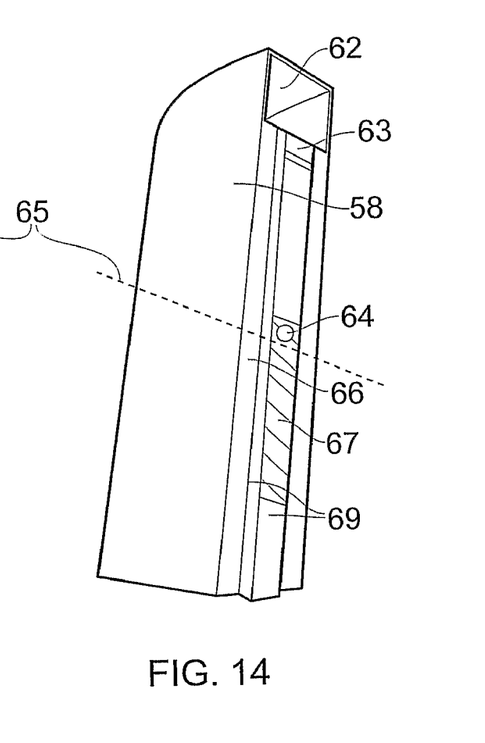

An alternative arrangement for an air intake duct 58, on the top of the bag, is shown in FIGS. 13 and 14. The upper edge of the inflatable device is illustrated in FIGS. 13 and 14 by reference number 65. Reference number 66 shows a portion of the duct arranged inside the inflatable device. The duct further comprise an opening 62, an strap lock 63 attached to duct 58 where strap 69 goes into and around duct 58. Strap 69 is attached in the bag in a zone 67 and has an overlapping joint attached with a ring 64. The exposed portion of duct 58 can be regulated by opening the strap lock 63 and retracting/pushing in the duct to the desired position, in order to arrive at an optimal position in relation to the vehicle.

The invention claimed is:

1. An inflatable drag reduction device for vehicles, comprising an inflatable bag of a durable, flexible non-elastic and generally air-tight material, arranged for attachment to the vehicle, said bag comprising a plurality of conjoined panels, the bag further comprising an air duct arranged for allowing the inflow of air into the interior of the bag when the vehicle is in motion, the bag further comprising internal planar ribs of a generally non-elastic material, each such rib having two ends, a planar surface and an outer and inner edge, wherein said outer edge of each rib is attached to the internal surface of a panel and wherein each end is attached to an end of an adjacent rib, the ribs being arranged such that the surface of the ribs are aligned transversely to the vertical axis of the bag when in an inflated state, and further wherein the shape and dimensions of the ribs are chosen so as to cause the device, when in an inflated state, to assume a predetermined geometrical shape in the plane perpendicular to the vertical axis of the bag when in the inflated state, said shape in the perpendicular plane corresponding to the shape of the cojoined ribs, whereby the panels are prevented from outward billowing by the ribs and to thus be maintained in an essentially planar orientation.

2. An inflatable drag reduction device according to claim 1, further comprising attachment arrangement adapted for removable engagement with receiving members attached to the vehicle.

3. An inflatable drag reduction device according claim 2, further comprising a weighted body arranged in the interior of the device and connected by a line or cord to one or more of the panels via a pulley, said weight and cord arranged such that, when the device is inflated by the pressure of air entering through the duct, the cord will pull the weighted body into a raised position, and further such that, when the internal air pressure is reduced the weighted body will fall to a lower position whereby the cord pulls the inflatable device into a compact, collapsed configuration.

4. An inflatable drag reduction device according to claim 3, wherein the device is adapted for attachment to the rear of the vehicle, and the predetermined geometrical shape of the device in the inflated state has a triangular cross section.

5. An inflatable drag reduction device according to claim 3, wherein the device is adapted for attachment between two sections of a multi-section vehicle, and the predetermined geometrical shape of the device in the inflated state has a rectangular cross section.

6. An inflatable drag reduction device according to claim 3, wherein the cojoined ribs form an internal opening collectively forming a vertical channel, and further wherein the cord attached to the weighted body passes through the channel and is attached at a lower panel of the device.

7. An inflatable drag reduction device according to claim 2, wherein the receiving member attached to the vehicle comprise attachment rings located at the upper rear corners of the vehicle, and wherein the attachment arrangement comprises hooks through which pass cords, at least one end of said cords being attached to the upper corners of a rear panel of the device, whereby the hooks can be attached to the rings, and the cord pulled through the hooks so as to hoist the device into place.

8. An inflatable drag reduction device according to claim 7, wherein the attachment rings are connected to a cincture strap, adapted for removable mounting around the rear of the vehicle or a section of the vehicle.

9. An inflatable drag reduction device according to claim 3, wherein the weighted body is movable arranged in a vertical sleeve in the interior of the device.

10. An inflatable drag reduction device according to claim 1, wherein the duct is arranged at the side of the vehicle.

11. An inflatable drag reduction device according to claim 10, wherein the duct is arranged at the top of the vehicle.

12. An inflatable drag reduction device according to claim 1 further comprising a tensioning cord arranged in the interior of the device, between a bottom panel and a top panel of the device, the length of the cord selected to as to prevent the outward billowing of the top and bottom panels, and to thus gold said panels in an essentially planar orientation.

13. An inflatable drag reduction device according to claim 1, wherein the ribs and the co-joined panels are both made of the same flexible, non-elastic material.

* * * * *